(12) United States Patent
Sylvain (10) Patent No.: US 7,302,258 B1
(45) Date of Patent: Nov. 27, 2007

(54) CALL TRANSFER FOR AN INTEGRATED PACKET AND WIRELESS SERVICE USING A TEMPORARY DIRECTORY NUMBER

(75) Inventor: Dany Sylvain, Gatineau (CA)

(73) Assignee: Nortel Networks Limited, St. Laurent (CA)

( * ) Notice: Subject to any disclaimer, the term of this patent is extended or adjusted under 35 U.S.C. 154(b) by 302 days.

(21) Appl. No.: 10/723,831

(22) Filed: Nov. 26, 2003

(51) Int. Cl.
*H04Q 7/20* (2006.01)

(52) U.S. Cl. ............... 455/432.1; 455/428; 455/422.1; 455/552.1; 455/553.1; 370/328; 370/338

(58) Field of Classification Search ............... 455/445, 455/446, 422.1, 560, 432.1, 450, 428, 552.1, 455/550.1; 370/216, 238, 351, 328–338

See application file for complete search history.

(56) References Cited

U.S. PATENT DOCUMENTS

| | | | |
|---|---|---|---|
| 5,659,598 A | 8/1997 | Byrne et al. ............... 455/436 |
| 5,890,054 A * | 3/1999 | Logsdon et al. ............ 455/11.1 |
| 6,014,377 A | 1/2000 | Gillespie .................... 370/351 |
| 6,052,597 A * | 4/2000 | Ekstrom .................... 455/456.3 |
| 6,104,799 A * | 8/2000 | Jain et al. ................. 379/211.01 |
| 6,181,938 B1 | 1/2001 | Salmela et al. ............. 455/433 |
| 6,243,581 B1 | 6/2001 | Jawanda |
| 6,363,246 B1 | 3/2002 | Williams et al. ............ 455/403 |
| 6,373,828 B1 | 4/2002 | Stewart et al. |
| 6,633,636 B1 * | 10/2003 | McConnell et al. ... 379/220.01 |
| 6,791,988 B1 * | 9/2004 | Hameleers et al. .......... 370/401 |
| 2002/0085516 A1 | 7/2002 | Bridgelall ................... 370/329 |
| 2002/0147008 A1 * | 10/2002 | Kallio ....................... 455/426 |
| 2003/0224795 A1 * | 12/2003 | Wilhoite et al. ............ 455/445 |
| 2004/0160932 A1 * | 8/2004 | Yegoshin .................... 370/338 |
| 2005/0159153 A1 * | 7/2005 | Mousseau et al. ........ 455/432.1 |

FOREIGN PATENT DOCUMENTS

WO 02/19750 3/2002

OTHER PUBLICATIONS

Adachi et al, "A Handoff Examination of a Hybrid System Using Cellular and Ad-Hoc Modes," IEICE Transactions on Communications, Institute of Electronics Information and Communications Enginerring, Tokyo, Japan, Nov. 2000, vol. E83-B, No. 11, pp. 2494-2500, XP001065366.
International Search Report for PCT/IB2004/001668, mailed Jul. 5, 2005.
International Search Report for PCT/IB2004/001672 mailed Jan. 27, 2005.

* cited by examiner

*Primary Examiner*—Rafael Perez-Gutierrez
*Assistant Examiner*—Khai Nguyen
(74) *Attorney, Agent, or Firm*—Withrow & Terranova, PLLC (57) ABSTRACT

The present invention relates to a communication environment where calls are established with a single mobile terminal through either a cellular network or a packet network via a local wireless adaptor, which is capable of wirelessly communicating with the mobile terminal. As such, the mobile terminal may facilitate traditional cellular calls via the wireless network, or packet-based calls via the local wireless adaptor. When the mobile terminal is involved in a call and within a communication zone of the local wireless adaptor, the packet-based call is facilitated via the local wireless adaptor. As the mobile terminal approaches the outer limits of the communication zone, the call to the mobile terminal is transferred to another connection which is established through the cellular network. As such, the call may continue via the cellular network when local wireless communications are no longer available or not desired by the user.

35 Claims, 7 Drawing Sheets

FIG. 5 ent invention.

CALL TRANSFER FOR AN INTEGRATED PACKET AND WIRELESS SERVICE USING A TEMPORARY DIRECTORY NUMBER

CROSS-REFERENCE TO RELATED APPLICATIONS

This application is related to U.S. patent application Ser. No. 10/693,540 filed Oct. 24, 2003 entitled CALL TRANSFER FOR AN INTEGRATED WIRELINE AND WIRELESS SERVICE USING A TEMPORARY DIRECTORY NUMBER; and U.S. patent application Ser. No. 10/693,539 filed Oct. 24, 2003 entitled CALL TRANSFER FOR AN INTEGRATED WIRELINE AND WIRELESS SERVICE USING A TEMPORARY DIRECTORY NUMBER, both currently pending, the disclosures of which are incorporated herein by reference in their entireties.

FIELD OF THE INVENTION

The present invention relates to mobile communications, and in particular to allowing a single mobile terminal to transition from communicating over a packet network to communicating over a wireless network.

BACKGROUND OF THE INVENTION

With the growing acceptance of local wireless communication technologies, such as wireless local area network (WLAN) and Bluetooth technologies, numerous computing and communication devices are able to facilitate packet-based, mobile communications. In concert, there is a growing movement to support voice communications over packet-based networks, in addition to the circuit-switched communications supported by existing public switched telephone networks (PSTNs) and cellular networks. The convergence of these trends will result in mobile terminals, such as cellular telephones and wireless personal digital assistants (PDAs), that are capable of communicating using traditional cellular techniques over a cellular network as well as communicating using packet-based techniques over a packet network using local wireless communications. As this convergence matures, voice over packet (VoP) calls will be facilitated via the local wireless communications and circuit-switched calls will be supported via the cellular network for a single mobile terminal.

Unfortunately, local wireless communications are geographically limited, in that the communication range for local wireless communications is much smaller than that provided by cellular services. To ensure the mobility of the mobile terminal, there is a need to be able to transition a call from the local wireless communication interface to a cellular interface when the mobile terminal is no longer able to support local wireless communications. Thus, if a user is participating in a VoP call via the local wireless communications and then moves out the area supported by the local wireless communications, the call would be dropped. However, given the extensive cellular coverage available, there is a strong likelihood that a call could be supported via the cellular network. As such, there is a need for an efficient and effective technique for transferring a call supported via local wireless communications to one supported by cellular communications.

SUMMARY OF THE INVENTION

The present invention relates to a communication environment where calls are established with a single mobile terminal through either a cellular network or a packet network via a local wireless adaptor, which is capable of wirelessly communicating with the mobile terminal. As such, the mobile terminal may facilitate traditional cellular calls via the wireless network, or packet-based calls via the local wireless adaptor. The local wireless adaptor and mobile terminal communicate via a local wireless interface, and as such, communications via the packet network through the local wireless adaptor are only possible within a limited communication zone supported by the local wireless adaptor. When the mobile terminal is involved in a call and within the communication zone of the local wireless adaptor, the packet-based call is facilitated via the local wireless adaptor. As the mobile terminal approaches the outer limits of the communication zone, the call to the mobile terminal is transferred to another connection which is established through the cellular network. As such, the call may continue via the cellular network when local wireless communications are no longer available or not desired by the user.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to providing a mobile terminal that is capable of communicating via a cellular-based wireless network, as well as via a packet network through a local wireless adaptor. The local wireless adaptor is coupled to the packet network in traditional fashion, and communicates wirelessly with the mobile terminal using local wireless access technology, such as traditional analog and digital cordless technologies, 802.11 wireless local area network technologies, and Bluetooth technology. The mobile terminal is preferably associated with a primary directory number, and will be associated with a temporary directory number for cellular access while roaming. Communications with the wireless network can use any available cellular access technology, such as time division multiple access (TDM), code division multiple access (CDMA), and orthogonal frequency division multiple access (OFDM).

The mobile terminal may be adapted to communicate via packet-based or cellular techniques with a service node, which controls the routing of incoming calls directed to the mobile terminal. The mobile terminal and service node may cooperate to determine when the mobile terminal is within a zone in which communication via the local wireless access technology is possible, and provide information to the service node bearing on whether the mobile terminal is within or outside of the zone. The service node will take this information and direct incoming calls to the primary directory number to the mobile terminal via the local wireless adaptor when the mobile terminal is within the local communication zone, and direct incoming calls to the mobile terminal via the cellular network when the mobile terminal is outside of the zone. As such, incoming calls are either routed through the cellular network or through the packet network to the local wireless adaptor, depending on whether the local wireless adaptor can effectively communicate with the mobile terminal.

Regardless of whether a packet-based call is originated from or received by the mobile terminal via the local wireless adaptor, the present invention provides for transferring the connection for the call such that it is reestablished through the cellular network when the mobile terminal moves outside of the communication zone of the local wireless adaptor. Preferably, the service node and mobile terminal will cooperate to monitor the quality of the call or other indicia indicative of the ability of the local wireless adaptor to effectively communicate with the mobile terminal, to determine whether or not the mobile terminal is within or outside of the communication zone. When the mobile terminal leaves the communication zone, the service node will initiate a transition of the call to the temporary directory number, which is associated with the cellular network, for the mobile terminal. Preferably, the service node will trigger a gateway to transfer the call, and once the connection through the cellular network is established, drop the connection to the mobile terminal via the local wireless adaptor. Those skilled in the art will recognize numerous techniques for triggering the servicing gateway and other gateways to initiate a call to the mobile terminal via the cellular network directory number, such as in traditional call transfer, establishing a three-way call, or simply establishing separate telephony connections. The following description will enable those skilled in the art to practice the invention. An overview of an exemplary network architecture is provided prior to delving into the operation of the preferred embodiments of the present invention.

Figure 1:
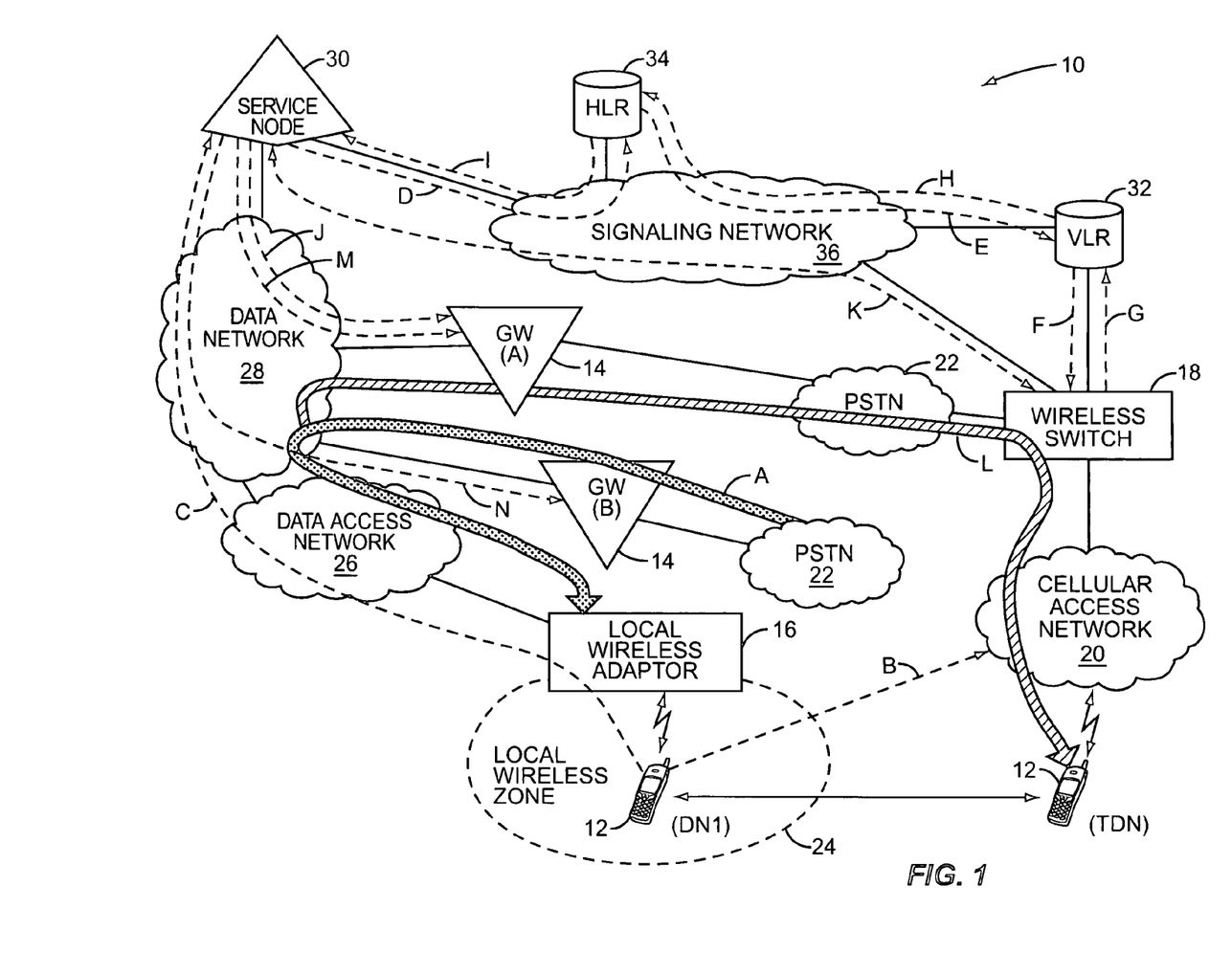
FIG. 1 is a block representation of a communication environment according to one embodiment of the present invention.

With reference to FIG. 1, a communication environment 10 allows a mobile terminal 12 to communicate via one or more gateways 14 through a local wireless adaptor 16, as well as via a wireless switch 18 through a cellular access network 20. The gateways 14 and wireless switch 18 may be operatively coupled via one or more portions of public switched telephone networks (PSTN) 22, and communications therebetween may be based on time-division multiplex (TDM) or packet technology.

The local wireless adaptor 16 interfaces with a telephone line connected to a gateway 14, and facilitates wireless communications with the mobile terminal 12. For an incoming or outgoing call via the telephone line, the local wireless adaptor 16 will provide a circuit-switched interface to the telephone line and a wireless interface to the mobile terminal 12, wherein the mobile terminal 12 may operate similarly to a traditional cordless telephone. The local wireless adaptor 16 provides a wireless interface having a limited range, and as such, will provide a local wireless adaptor zone 24, which defines an area or range in which communications between the local wireless adaptor 16 and the mobile terminal 12 are possible. The local wireless adaptor 16 is operatively coupled through a data access network 26 and data network 28 to a service node 30 and gateways 14, directly or via customer premise equipment (not shown). The customer premise equipment may be a cable modem, Digital Subscriber Line (DSL) modem, Integrated Services Digital Network (ISDN) modem, Ethernet or like communication terminal that provides access to the data access network 26 via the corresponding cable network, Digital Subscriber Line (DSL) network, IDSN or Ethernet forming the data access network 26. The service node 30 is configured to interact with the gateways 14 via the data network 28 to assist in processing calls involving the mobile terminal 12 and routed in part over the PSTN 22 or cellular network, as well as the data network 28.

The service node 30 is also adapted to access a temporary directory number (TDN) from the wireless switch 18 or an associated visiting location register (VLR) 32 via a signaling network 36, directly or indirectly via a home location register (HLR) 34. The temporary directory number is a directory number temporarily assigned to the mobile terminal 12 while visiting or roaming into a cellular network. The VLR 32 generally operates in traditional fashion, and may be specially configured to provide the temporary directory number or access it from the wireless switch 18 currently servicing the mobile terminal 12. In operation, the HLR 34 and VLR 32 cooperate to provide the temporary directory number to the service node 30. The service node 30 will use the temporary directory number to establish connections between the gateways 14 and the mobile terminal 12 via the cellular network.

Assume that a packet-based call is established via the local wireless adaptor 16. When the user engaged in the call takes the mobile terminal 12 outside of the local wireless adaptor zone 24, the ability of the local wireless adaptor 16 to effectively communicate with the mobile terminal 12 will decrease, and thus, support will diminish and ultimately stop. Accordingly, the mobile terminal 12 and service node 30 will cooperate to directly or indirectly monitor metrics or other signals indicative of an ability to maintain communications with the mobile terminal 12 via the local wireless adaptor 16. The metrics may include actual bit error rates, signal strengths, signal-to-interference ratios, or any other indication bearing on the ability to provide a minimum level of quality. The other signals may include a periodic signal between the mobile terminal 12 and the service node 30 to ensure communications are possible. Once there is evidence indicative of the mobile terminal 12 leaving the local wireless adaptor zone 24, the service node 30 will cooperate with gateway 14A to initiate a call to the mobile terminal 12 using a temporary directory number (TDN), transfer the call to the new connection established via the wireless switch 18, and drop the connection via the local wireless adaptor 16.

Alternatively, the user may provide instructions to the mobile terminal 12 to initiate transfer of the call to the cellular network.

Continuing with FIG. 1, a high level process is illustrated for accessing a temporary directory number and facilitating a transfer of a call to the mobile terminal 12 from the local wireless adaptor 16 to the cellular network. Initially, an incoming call intended for the mobile terminal 12 using directory number DN1 is established through the data network 28 and data access network 26 via gateway 14B and the local wireless adaptor 16, which will facilitate bi-directional communications to support the call with the mobile terminal 12 (step A). At some point, either before the call, during the call, or when either the mobile terminal 12 or service node 30 detects that the mobile terminal 12 is leaving the local wireless adaptor zone 24, the mobile terminal 12 will initiate cellular registration via the cellular access network 20 (step B). The cellular registration may take place while the call via the local wireless adaptor 16 is in progress, and as such, the mobile terminal 12 can be configured to concurrently facilitate wireless communications with the local wireless adaptor 16 as well as communications with the cellular access network 20. Upon registration with the cellular access network 20, the mobile terminal 12 may be assigned the temporary directory number by the wireless switch 18 or other appropriate entity, including the VLR 32. As described below, the temporary directory number will be provided to the service node 30 to establish a connection with the mobile terminal 12 via the wireless switch 18 and the associated cellular access network 20.

To obtain the temporary directory number, the service node 30 will cooperate with the mobile terminal 12 to determine the need to transfer support of the call to the cellular access network 20 by appropriate signaling via the data access network 26 and data network 28 (step C). The service node 30 will then take the necessary steps to access the temporary directory number, directly or indirectly from the VLR 32 or wireless switch 18, depending on where the temporary directory number is stored in association with the registration for the mobile terminal 12. In the illustrated embodiment, the service node 30 will send a request for the temporary directory number to the HLR 34 (step D), which will send a request to the appropriate VLR 32 (step E), which is associated with the cellular access network 20 currently servicing the mobile terminal 12. If the VLR 32 does not have the temporary directory number for the mobile terminal 12, a request may be made of the wireless switch 18 (step F) or other entity having the temporary directory number. Assuming the wireless switch 18 keeps track of the temporary directory number, the wireless switch 18 will respond to the request from the VLR 32 by returning the temporary directory number (step G). The VLR 32 will then forward the temporary directory number to the HLR 34 (step H), which will in turn forward the temporary directory number to the service node 30 (step I).

Once the service node 30 obtains the temporary directory number, it will instruct gateway 14A to prepare a connection to wireless switch 18 (step J) and initiates a call to the temporary directory number served by the wireless switch 18 (step K) to initiate establishing a connection for the call through the cellular access network 20 to gateway 14A. Gateway 14A and wireless switch 18 will cooperate to establish a connection from gateway 14A to the mobile terminal 12 via the wireless switch 18 and cellular access network 20 (step L). Once the connection is established between gateway 14A and the wireless switch 18, the service node 30 will instruct gateways 14A and 14B to establish a connection therebetween and effect a transfer of the call (steps M and N). At this point, the incoming call is connected to the newly established connection to the mobile terminal 12 through the wireless switch 18 and cellular access network 20 via gateways 14A and 14B, while the connection to the mobile terminal 12 through the local wireless adaptor 16 is dropped.

Figure 2A:
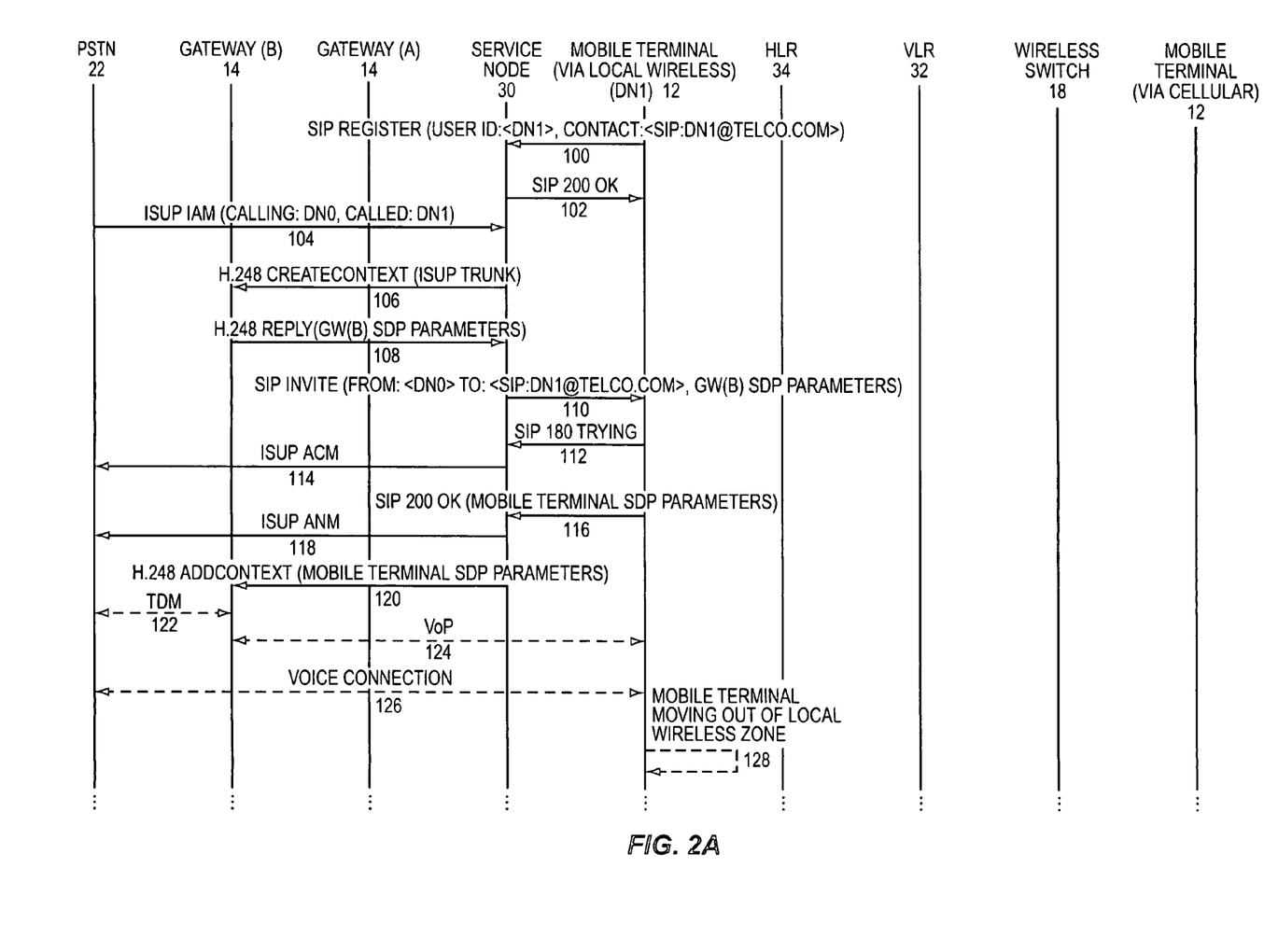
FIGS. 2A-2C provide a communication call flow diagram wherein a mobile terminal moves out of range of PSTN communications via a local wireless adaptor.
Figure 2B:
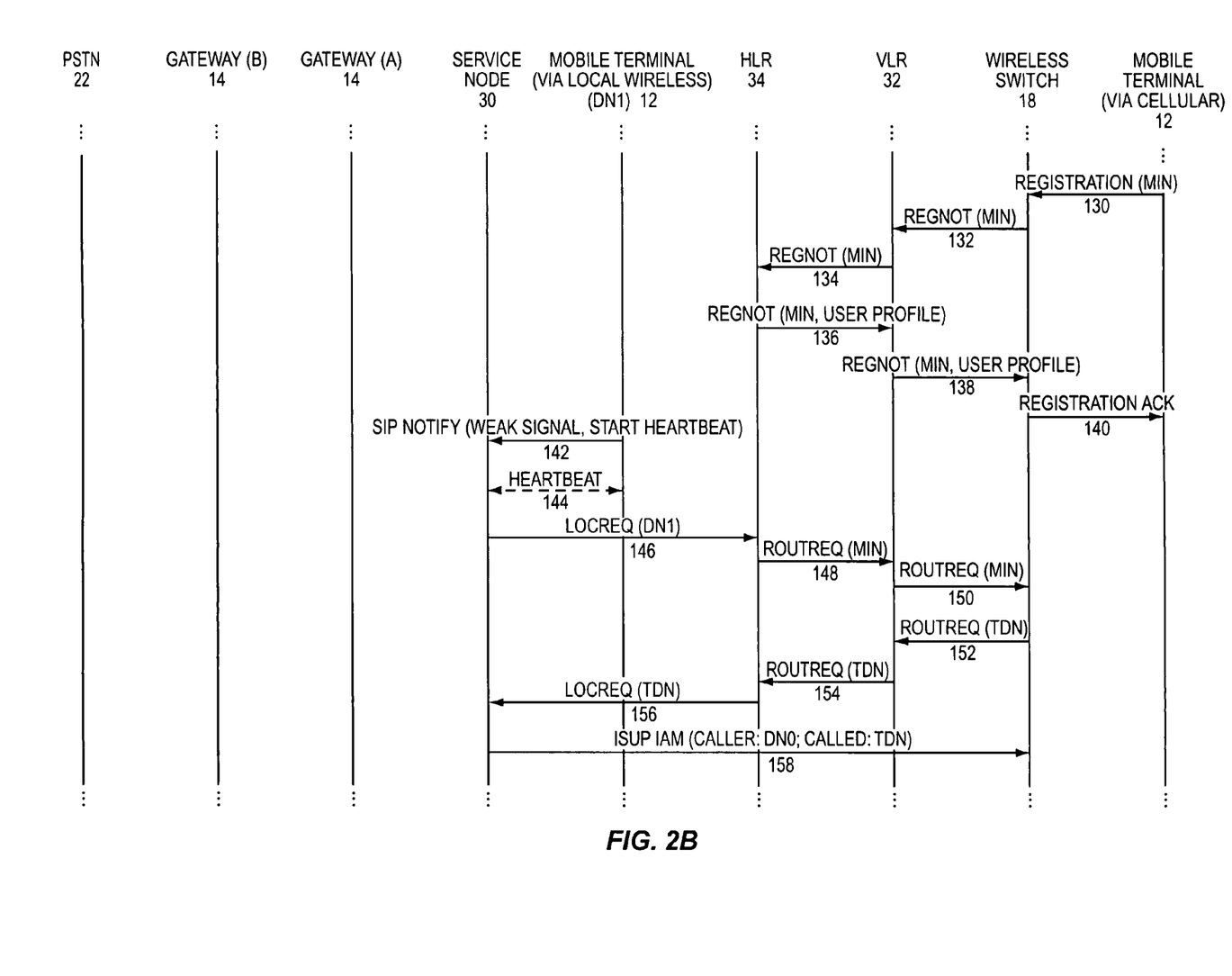
Figure 2C:
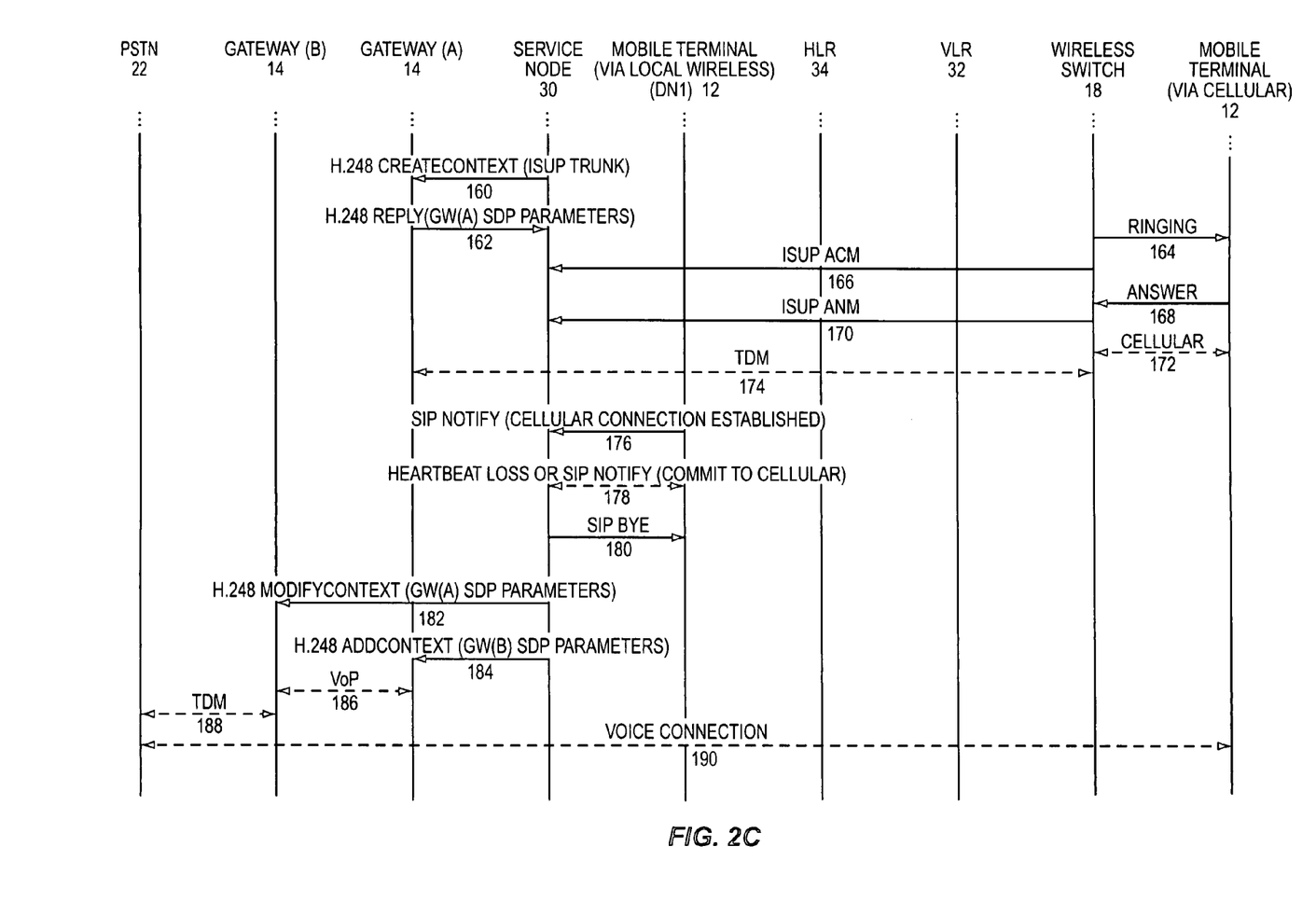

An exemplary communication flow for the above process is provided in FIGS. 2A-2C. In this communication flow, communications between the service node 30 and the mobile terminal 12 via the data network 28 and data access network 26 through the local wireless adaptor 16 are facilitated using the Session Initiation Protocol (SIP). Interaction between the service node 30 and the gateways 14 will use H.248. Signaling between the service node 30 and entities in the cellular network, such as the wireless switch 18, will use Integrated Services User Part (ISUP) protocols. Access or registration with an HLR 34 or VLR 32 is illustrated as using IS41 CDMA protocols. Those skilled in the art will recognize a number of other applicable protocols for facilitating communications amongst the various entities.

Assuming the mobile terminal 12 is within the local wireless zone 24, the mobile terminal 12 will register with the service node 30 using a SIP Register message, which may include the primary directory number associated with the mobile terminal 12 as a User ID (DN1) as well as a contact address on the data access network 26, such as DN1@TELCO.COM (step 100). The service node 30 will acknowledge registration by sending a SIP 200 OK back to the mobile terminal 12 to indicate that registration was successful (step 102). Since the mobile terminal 12 is registered with the service node 30 as being supported through the local wireless adaptor 16, incoming calls will be directed to the mobile terminal 12 through the local wireless adaptor 16. As such, when an incoming call from the PSTN 22 is intended for directory number DN1, an ISUP Initial Address Message (IAM) is routed to the service node 30, which acts as a call signaling entity for the mobile terminal 12 (step 104). The ISUP IAM will identify the calling and called parties by their respective directory numbers DN0 and DN1. The service node 30 will respond to the ISUP IAM by taking the necessary steps to connect the call to the local wireless adaptor 16 through the data access network 26 and the data network 28. Assuming that gateway 14B is the interface between the PSTN 22 and the data network 28, the service node 30 will send an H.248 CreateContext message to specify an ISUP trunk for the call between gateway 14B and the PSTN 22 (step 106). Gateway 14B will allocate the trunk, as well as provide any addressing and port information for communicating with gateway 14B over the data network 28 to the service node 30 in an H.248 Reply message (step 108). The port and addressing information may be provided as Session Data Protocol (SDP) parameters to use in the SIP signaling. In general, the SDP parameters provide the port and addressing information to which packets will be sent to support the communication session.

To establish the connection between gateway 14B and the mobile terminal 12 through the data network 28 and data access network 26 via the local wireless adaptor 16, the service node 30 will send a SIP Invite message to the mobile terminal 12 using the SIP address (DN1@TELCO.COM) for the mobile terminal 12 and indicate that the call is from directory number DN0 (step 110). The SIP Invite will also include the SDP parameters for gateway 14B. The mobile terminal 12 will respond with a SIP 180 Trying message (step 112), wherein the service node 30 will send an ISUP Address Complete Message (ACM) back through the PSTN 22 in response to the ISUP IAM (step 114). When the mobile terminal 12 is answered, it will send a SIP 200 OK message including the mobile terminal's SDP parameters, which will include the port and address necessary to communicate with the mobile terminal 12, to the service node 30 (step 116). The service node 30 will then send an ISUP Answer Message (ANM) back through the PSTN 22 (step 118) to indicate that the mobile terminal 12 has been answered. Meanwhile, the service node 30 will send an H.248 Add-Context message with the mobile terminal's SDP parameters to gateway 14B (step 120). At this point, a circuit-switched connection is established between gateway 14B and the calling party through the PSTN 22 (step 122). Further, gateway 14B and the mobile terminal 12 can communicate with each other over a packet data session through the data network 28 and the data access network 26 via the local wireless adaptor 16 (step 124). The circuit-switched connection is generally a Time Division Multiplexed (TDM) connection, and the packet data session is a voice over packet (VoP) session, such as voice over IP (VoIP). The circuit-switched and packet data sessions will be associated with one another within gateway 14B to provide a voice connection between the mobile terminal 12 and the calling party in the PSTN 22 (step 126).

In this embodiment, assume the mobile terminal 12 will monitor various metrics to determine its relative ability to communicate through the local wireless adaptor 16. When the mobile terminal 12 begins moving out of the local wireless zone 24 (step 128), but has not already registered with the local cellular network, it will initiate a registration process, while the existing call is being serviced through the local wireless adaptor 16. In a CDMA environment, registration entails the mobile terminal 12 sending a Registration message including the mobile identification number (MIN) for the mobile terminal 12 to the wireless switch 18 via the cellular access network 20 (step 130). The wireless switch 18 will send a Registration Notification (REGNOT) message including the MIN to the supporting VLR 32 (step 132), which will send a similar REGNOT message with the MIN to the HLR 34 for the mobile terminal 12 (step 134). The HLR 34 will respond with a REGNOT response identifying the MIN and the user profile, which defines the services available to the mobile terminal 12 to the VLR 32 (step 136), which will send a REGNOT response message with the same information to the wireless switch 18 (step 138). The wireless switch 18 will send a Registration Acknowledgement (ACK) to the mobile terminal 12 to indicate registration was complete (step 140).

While the mobile terminal 12 is within the local wireless zone 24, various techniques may be employed to let the service node 30 determine whether communications with the mobile terminal 12 are possible. As noted above, various communication metrics may be monitored to determine the relative ability of the mobile terminal 12 to maintain communications through the local wireless adaptor 16. In this embodiment, assume that the mobile terminal 12 and the service node 30 periodically communicate with each other to provide a systematic alert indicative of the ability of the mobile terminal 12 to communicate via the local wireless adaptor 16. Assume this periodic alert is a message sent from the mobile terminal 12 to the service node 30 to allow the service node 30 to realize the mobile terminal 12 is still able to communicate via the local wireless adaptor 16. Also, assume that this periodic alert is only sent during an active call and only when the mobile terminal 12 detects an initial deterioration of the local wireless connection. For conciseness, the periodic signal is referred to as a heartbeat signal indicative of the presence of the mobile terminal 12 within the local wireless zone 24. Assume the heartbeat signal is periodically provided to the service node 30.

Accordingly, the mobile terminal 12 will notify the service node 30 to start the heartbeat process, and will then send periodic heartbeat signals to the service node 30 or otherwise identify that the signal with the local wireless adaptor 16 is growing weak (step 142). In a SIP environment, this information may be sent in a SIP Notify message. Assume that the illustrated embodiment incorporates the heartbeat process between the service node 30 and the mobile terminal 12 (step 144). Recognizing that communications with the mobile terminal 12 through the local wireless adaptor 16 will soon be impossible, the service node 30 will access the HLR 34 to obtain a directory number associated with the mobile terminal 12 through the cellular network. The directory number to use in the cellular network is the temporary directory number, and is accessed in a CDMA environment with a Location Request (LOCREQ) message, which identifies the primary directory number DN1 associated with the mobile terminal 12 to the HLR 34 (step 146). If the HLR 34 does not already possess the temporary directory number, it will access the VLR 32 to obtain it using a Route Request (ROUTREQ) message identifying the MIN associated with directory number DN1 (step 148). If the VLR 32 does not have a temporary directory number, it will send the ROUTREQ message to the wireless switch 18 (step 150), which will respond with a ROUTREQ reply identifying the temporary directory number (step 152). The VLR 32 will then send the temporary directory number in a ROUTREQ message back to the HLR 34 (step 154), which will forward the temporary directory number in a LOCREQ reply to the service node 30 (step 156).

Once armed with the temporary directory number, the service node 30 will interact with gateway 14A and the wireless switch 18, directly or indirectly, to establish a connection between gateway 14A and the mobile terminal 12 through the cellular network. Once the connection is established, the call is transferred from being connected to the mobile terminal 12 via the local wireless adaptor 16 to the newly formed connection, which is supported by gateway 14A and extends through the cellular network. In particular, the service node 30 will initially send an ISUP IAM identifying the caller's directory number DN0 and the called directory number, which is now the temporary directory number, to the wireless switch 18 (step 158). The service node 30 will then send an H.248 CreateContext message to gateway 14A to allocate a trunk for the connection to the cellular network (via the PSTN 22, wireless switch 18, and cellular access network 20) (step 160). Gateway 14A will allocate the trunk to the wireless switch 18, as well as a port through which the connection will be facilitated via the data network 28, and send the relevant port and addressing information as SDP parameters to the service node 30 (step 162). At this point, gateway 14A is ready to support a circuit-switched connection to the mobile terminal 12 via the cellular network as well as a packet connection through the data network 28 to complete the call.

In the meantime, the wireless switch 18 will send a Ringing signal to the mobile terminal 12 to indicate that a call is coming in through the cellular network (step 164), as well as respond to the ISUP IAM by sending an ISUP ACM back to the service node 30 (step 166). In one embodiment, the mobile terminal 12 is adapted to recognize that a call is in progress via the local wireless adaptor 16 and a transitional process is taking place. In recognition of these circumstances, the mobile terminal 12 may automatically answer the incoming call, which will trigger an Answer message being sent back to the wireless switch 18 (step 168). Notably, a tone or other indication could be provided to the user of the mobile terminal 12, wherein the user may take some action to manually answer the call via the cellular network. In either circumstance, the wireless switch 18 will forward an ISUP ANM to the service node 30 (step 170) in response to the mobile terminal 12 being answered. The mobile terminal 12 and the wireless switch 18 will establish a cellular connection (step 172), wherein a circuit-switched, TDM connection is established between the wireless switch 18 and gateway 14A (step 174).

The mobile terminal 12 will alert the service node 30 that the cellular connection is established by sending an appropriate SIP Notify message to the service node 30 (step 176). When the heartbeat signal is lost or a SIP Notify message is sent to the service node 30 to commit to the cellular connection (step 178), the connection via the local wireless adaptor 16 is dropped. If a SIP Notify message is sent to the service node 30 to direct the transfer to the cellular connection, the service node 30 may respond with a SIP Bye message to the mobile terminal 12 to confirm receipt of the instructions (step 180).

The service node 30 will then send an H.248 Modify-Context message including the SDP parameters for gateway 14A to gateway 14B (step 182), as well as send an H.248 AddContext message including the SDP parameters for gateway 14B to gateway 14A (step 184). As such, the respective gateways 14A and 14B have the necessary information to establish a packet data session between the two to connect the legs of the call that extend to the original caller in the PSTN 22 from gateway 14B as well as to the mobile terminal 12 via the cellular network from gateway 14A. Accordingly, a voice over packet session is established between gateways 14A and 14B for the call (step 186), and the original circuit-switched, TDM connection to the original calling party remains between the PSTN 22 and gateway 14B (step 188). As such, a voice connection is essentially established between the original caller and gateway 14B, between gateway 14B and gateway 14A, and between gateway 14A and the mobile terminal 12 through the cellular network to establish an overall voice connection (step 190).

Figure 3:
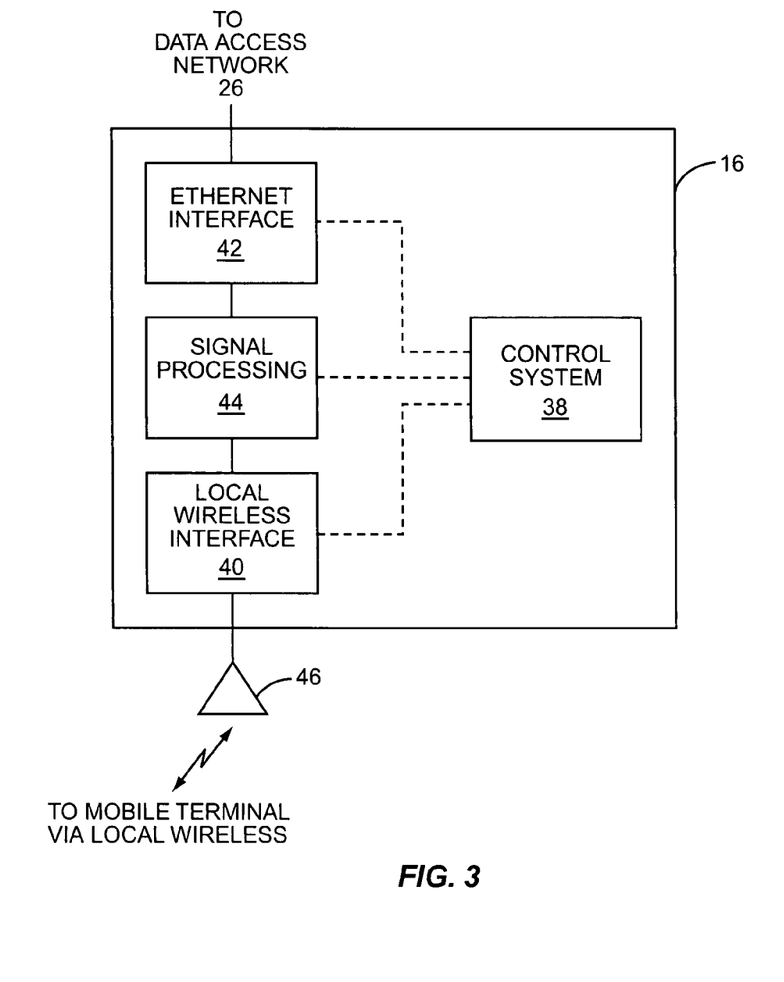
FIG. 3 is a block representation of a local wireless adaptor according to one embodiment of the present invention.

A block representation of the local wireless adaptor 16 is provided in FIG. 3. Preferably, the local wireless adaptor 16 will include a control system 38 operatively associated with a local wireless interface 40, an Ethernet interface 42, and a signal processing function 44. The signal processing function 44 may be part of the control system 38, and is capable of providing all the necessary coding, decoding, and conversions necessary to allow the Ethernet interface 42 to operate with the local wireless interface 40. The local wireless interface 40 is associated with an antenna 46, and is configured to communicate wirelessly with the mobile terminal 12 using any applicable wireless technology, such as traditional analog or digital cordless technology, wireless local area network (WLAN) technology including 802.11-based technologies, and Bluetooth technology. For example, the local wireless adaptor 16 may be a WLAN router, which is connected to a cable modem, digital subscriber line (DSL) modem, or LAN.

Figure 4:
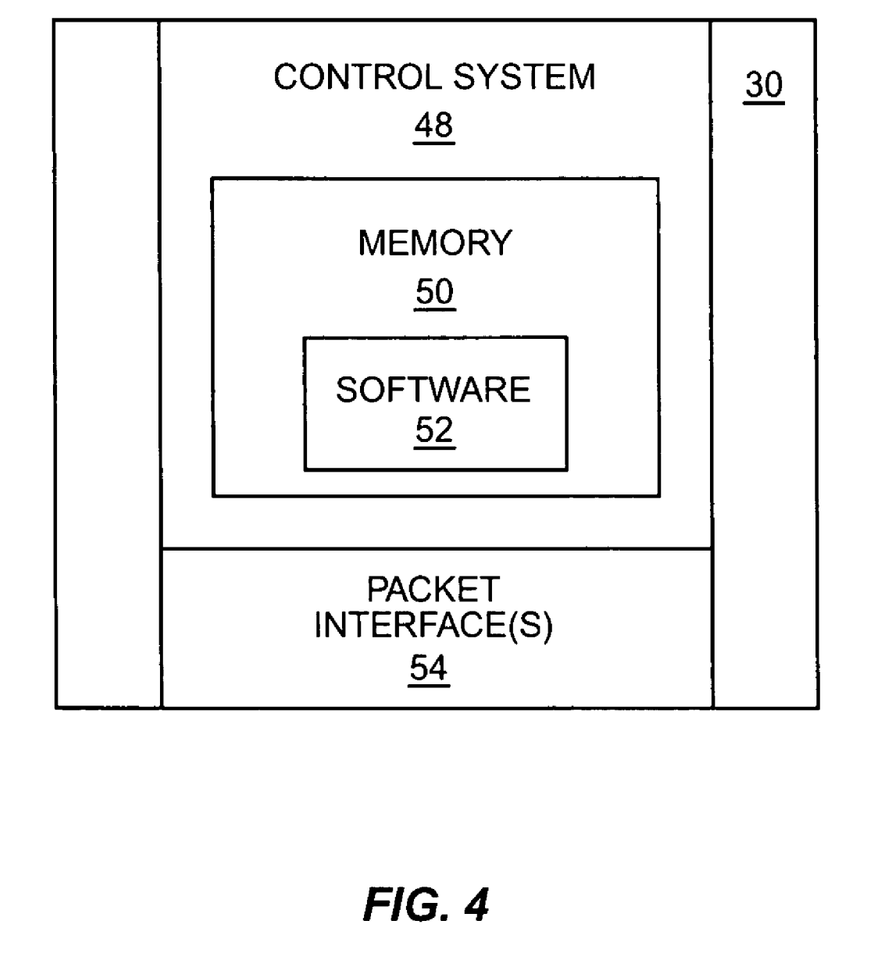
FIG. 4 is a block representation of a service node according to one embodiment of the present invention.

Turning now to FIG. 4, a block diagram of a service node 30 is illustrated. The service node 30 will preferably include a control system 48 having sufficient memory 50 to store the software 52 necessary for operation as described above. The control system 48 is also associated with one or more packet interfaces 54 to facilitate communications with the local wireless adaptor 16, mobile terminal 12, gateways 14, HLR 34, as well as directly or indirectly with other signaling entities of the cellular network, signaling network 36, or PSTN 22.

Figure 5:
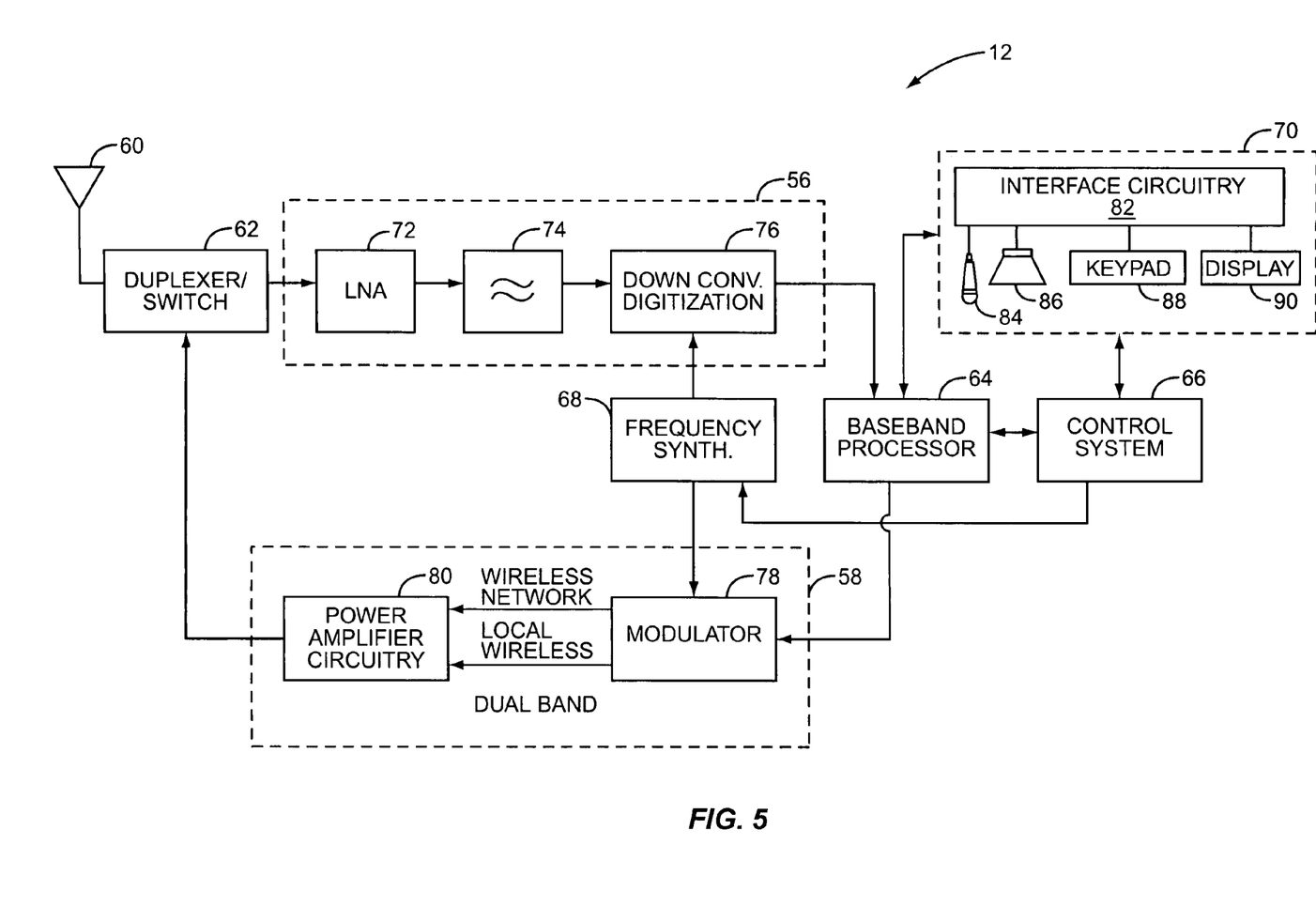
FIG. 5 is a block representation of a mobile terminal according to one embodiment of the present invention.

The basic architecture of the mobile terminal 12 is represented in FIG. 5 and may include a receiver front end 56, a radio frequency transmitter section 58, an antenna 60, a duplexer or switch 62, a baseband processor 64, a control system 66, a frequency synthesizer 68, and an interface 70. The receiver front end 56 receives information bearing radio frequency signals from one or more remote transmitters provided by a base station. A low noise amplifier 72 amplifies the signal. A filter circuit 74 minimizes broadband interference in the received signal, while downconversion and digitization circuitry 76 downconverts the filtered, received signal to an intermediate or baseband frequency signal, which is then digitized into one or more digital streams. The receiver front end 56 typically uses one or more mixing frequencies generated by the frequency synthesizer 68. The baseband processor 64 processes the digitized received signal to extract the information or data bits conveyed in the received signal. This processing typically comprises demodulation, decoding, and error correction operations. As such, the baseband processor 64 is generally implemented in one or more digital signal processors (DSPs).

On the transmit side, the baseband processor 64 receives digitized data, which may represent voice, data, or control information, from the control system 66, which it encodes for transmission. The encoded data is output to the transmitter 58, where it is used by a modulator 78 to modulate a carrier signal that is at a desired transmit frequency. Power amplifier circuitry 80 amplifies the modulated carrier signal to a level appropriate for transmission, and delivers the amplified and modulated carrier signal to the antenna 60 through the duplexer or switch 62.

As noted above, the mobile terminal 12 must be able to communicate via the local wireless adaptor 16 as well as via the cellular access network 20. Accordingly, the receiver front end 56, baseband processor 64, and radio frequency transmitter section 58 cooperate to provide either a cellular interface for the wireless access network 20 and the local wireless interface 40 for the local wireless adaptor 16. These functions may be implemented using redundant circuitry, or by configuring common circuitry to operate in different modes. The configuration of the mobile terminal 12 will be dictated by economics and designer choice. The mobile terminal 12 is configured such that if the local wireless interface 40 is not functional, communications are switched to the wireless network interface. Alternatively, the mobile terminal 12 could have both the local wireless interface 40 and the wireless network interface in operation at the same time and select one of the two for communication at any given time based on signal quality, registration, or other factors.

A user may interact with the mobile terminal 12 via the interface 70, which may include interface circuitry 82 associated with a microphone 84, a speaker 86, a keypad 88, and a display 90. The interface circuitry 82 typically includes analog-to-digital converters, digital-to-analog converters, amplifiers, and the like. Additionally, it may include a voice encoder/decoder, in which case it may communicate directly with the baseband processor 64. The microphone 84 will typically convert audio input, such as the user's voice, into an electrical signal, which is then digitized and passed directly or indirectly to the baseband processor 64. Audio information encoded in the received signal is recovered by the baseband processor 64, and converted by the interface circuitry 82 into an analog signal suitable for driving the speaker 86. The keypad 88 and display 90 enable the user to interact with the mobile terminal 12, input numbers to be dialed, address book information, or the like, as well as monitor call progress information.

The mobile terminal 12 will be adapted to cooperate with the service node 30 to provide communication metrics, heartbeat signals, or a combination thereof, in addition to supporting both local wireless and cellular communications. When a transfer is effected, the mobile terminal 12 may function to mix the signals for both paths to minimize the impact of the transfer. The mixing of the signals should not be cumbersome, since only one connection will be carrying voice information at any given time. Accordingly, during the transfer process, the local wireless connection will remain open as the cellular connection is opened. When the network effectively transfers the call, the voice information will simply transfer to the newly established connection via the cellular network and that information will be carried on the local wireless connection. Subsequently, the local wireless connection is dropped, and any local wireless processing may be stopped by the mobile terminal 12. As noted, the mobile terminal 12 may be adapted to automatically answer incoming cellular calls during the transfer process the minimize the impact on the user. Other embodiments may provide an indication to the user, including caller identification information, to let the user know that it is a transferred call and not a new call directed to the user. The mobile terminal 12 may be configured to recognize a certain entry or voice command from the user to effect the transfer, which from the mobile terminal's perspective will entail accepting the cellular call and subsequently dropping the local wireless connection, in addition to providing the internal transition from transmitting and receiving voice information over the local wireless connection to the cellular connection.

Those skilled in the art will recognize improvements and modifications to the preferred embodiments of the present invention. All such improvements and modifications are considered within the scope of the concepts disclosed herein and the claims that follow.

What is claimed is:

1. A method for transitioning a call with a mobile terminal from a packet network to a cellular network, wherein the call is initially established between a remote device and the mobile terminal via a local wireless adaptor coupled to a packet-based network, the method comprising:
   a) determining the call should be transferred to the mobile terminal via the cellular network;
   b) initiating a first connection between a first media gateway and the mobile terminal via the cellular network, wherein the call is initially established to comprise a remote connection between the remote device and a second media gateway and a local connection between the second media gateway and the mobile terminal via the local wireless adaptor over the packet-based network; and
   c) effecting a transfer of the call to the first connection between the first media gateway and the mobile terminal, wherein the effecting the transfer of the call further comprises establishing a new connection between the first and second media gateways to effectively connect the first connection between the first media gateway and the mobile terminal via the cellular network to the remote connection between the remote device and the second media gateway.

2. The method of claim 1 further comprising instructing the first media gateway to eliminate the local connection.

3. The method of claim 1 wherein determining the call should be transferred comprises:
   a) receiving information from the mobile terminal; and
   b) monitoring the information to determine whether the call should be transferred.

4. The method of claim 3 wherein the information is received via the local wireless adaptor over the packet-based network.

5. The method of claim 3 wherein the information is a periodic signal indicative of the mobile terminal being within a local wireless communication range of the local wireless adaptor.

6. The method of claim 3 wherein the information includes communication metrics bearing on the ability of the mobile terminal to communicate via the local wireless adaptor.

7. The method of claim 3 wherein the information indicates a user of the mobile terminal desires transfer of the call.

8. The method of claim 1 further comprising accessing a directory number, which is assigned to the mobile terminal by the cellular network, wherein the first connection is established using the directory number.

9. The method of claim 8 wherein the directory number is accessed via a home location register.

10. The method of claim 9 wherein the home location register accesses the directory number from a visiting location register associated with the cellular network.

11. The method of claim 10 wherein the visiting location register accesses the directory number from a wireless switch, which facilitates at least a portion of the first connection with the mobile terminal.

12. The method of claim 8 wherein the directory number is a temporary directory number and the mobile terminal is also associated with a primary directory number associated with the packet-based network.

13. The method of claim 1 wherein the mobile terminal registers with the cellular network while effecting communications via the local wireless adaptor.

14. The method of claim 13 wherein the mobile terminal registers with the cellular network while the call is in progress.

15. The method of claim 13 wherein the mobile terminal registers with the cellular network prior to the first connection being established via the cellular network.

16. The method of claim 1 wherein at least a portion of the call is a voice-over-packet call.

17. The method of claim 1 wherein at least a portion of the call is facilitated over a public switched telephone network.

18. A system for transitioning a call with a mobile terminal from a packet network to a cellular network, wherein the call is initially established between a remote device and the mobile terminal via a local wireless adaptor coupled to a packet-based network, the system comprising:
   a) at least one communication interface; and
   b) a control system associated with the at least one communication interface and adapted to:
      i) determine the call should be transferred to the mobile terminal via the cellular network;
      ii) initiate a first connection between a first media gateway and the mobile terminal via the cellular network, wherein the call is initially established to comprise a remote connection between the remote device and a second media gateway and a local connection between the second media gateway and the mobile terminal via the local wireless adaptor over the packet-based network; and iii) effect a transfer of the call to the first connection between the first media gateway and the mobile terminal, wherein to effect the transfer of the call the control system is further adapted to establish a new connection between the first and second media gateways to effectively connect the first connection between the first media gateway and the mobile terminal via the cellular network to the remote connection between the remote device and the second media gateway.

19. The system of claim 18 wherein the control system is further adapted to instruct the first media gateway to eliminate the local connection.

20. The system of claim 18 wherein to determine the call should be transferred, the control system is further adapted to:
   a) receive information from the mobile terminal; and
   b) monitor the information to determine whether the call should be transferred.

21. The system of claim 20 wherein the information is received via the local wireless adaptor over the packet-based network.

22. The system of claim 20 wherein the information is a periodic signal indicative of the mobile terminal being within a local wireless communication range of the local wireless adaptor.

23. The system of claim 20 wherein the information includes communication metrics bearing on the ability of the mobile terminal to communicate via the local wireless adaptor.

24. The system of claim 20 wherein the information indicates a user of the mobile terminal desires transfer of the call.

25. The system of claim 18 where the control system is further adapted to access a directory number, which is assigned to the mobile terminal by the cellular network wherein the first connection is established using the directory number.

26. The system of claim 25 wherein the directory number is accessed via a home location register.

27. The system of claim 26 wherein the home location register accesses the directory number from a visiting location register associated with the cellular network.

28. The system of claim 27 wherein the visiting location register accesses the directory number from a wireless switch, which facilitates at least a portion of the first connection with the mobile terminal.

29. The system of claim 25 wherein the directory number is a temporary directory number and the mobile terminal is also associated with a primary directory number associated with the packet-based network.

30. The system of claim 29 wherein the mobile terminal registers with the cellular network while the call is in progress.

31. The system of claim 29 wherein the mobile terminal registers with the cellular network prior to the first connection being established via the cellular network.

32. The system of claim 18 wherein the mobile terminal registers with the cellular network while effecting communications via the local wireless adaptor.

33. The system of claim 18 wherein at least a portion of the call is a voice-over-packet call.

34. The system of claim 18 wherein at least a portion of the call is facilitated over a public switched telephone network.

35. A system for transitioning a call with a mobile terminal from a packet network to a cellular network, wherein the call is initially established between a remote device and the mobile terminal via a local wireless adaptor coupled to a packet-based network, the system comprising:
   a) means for determining the call should be transferred to the mobile terminal via the cellular network;
   b) means for initiating a first connection between a first media gateway and the mobile terminal via the cellular network, wherein the call is initially established to comprise a remote connection between the remote device and a second media gateway and a local connection between the second media gateway and the mobile terminal via the local wireless adaptor over the packet-based network; and
   c) means for effecting a transfer of the call to the first connection between the first media gateway and the mobile terminal, wherein the means for effecting the transfer of the call further comprises establishing a new connection between the first and second media gateways to effectively connect the first connection between the first media gateway and the mobile terminal via the cellular network to the remote connection between the remote device and the second media gateway.

* * * * *